US006852792B1

(12) United States Patent
Capendale et al.

(10) Patent No.: US 6,852,792 B1
(45) Date of Patent: Feb. 8, 2005

(54) COATING COMPOSITION CONTAINING A LOW MFI ETHYLENE ACRYLIC ACID COPOLYMER

(75) Inventors: John Capendale, Bp Broek Op Langedijk (NL); Henk Felix, Da Beverwijk (NL); Karlheniz Hausmann, Auvenier (CH); Eleni Karayianni, Geneva (CH); Metske Steffen Osinga, Sj Haarlem (NL); Bernard Rioux, Puteaux (FR)

(73) Assignees: E. I. du Pont de Nemours and Company, Wilmington, DE (US); Paramelt B.V., Heerhugowaard (NL)

( * ) Notice: Subject to any disclaimer, the term of this patent is extended or adjusted under 35 U.S.C. 154(b) by 0 days.

(21) Appl. No.: 09/958,916

(22) PCT Filed: Apr. 13, 2000

(86) PCT No.: PCT/US00/09880

§ 371 (c)(1),
(2), (4) Date: Oct. 11, 2001

(87) PCT Pub. No.: WO00/63309

PCT Pub. Date: Oct. 26, 2000

(51) Int. Cl.$^7$ .............................................. C08L 31/00
(52) U.S. Cl. ..................................................... 524/556
(58) Field of Search ......................................... 524/556

(56) References Cited

U.S. PATENT DOCUMENTS

| 4,173,669 | A | | 11/1979 | Ashida et al. |
| 4,351,931 | A | | 9/1982 | Armitage |
| 4,693,909 | A | | 9/1987 | Ziegler et al. |
| 5,387,635 | A | | 2/1995 | Rowland et al. |
| 5,419,960 | A | | 5/1995 | Touhsaent |
| 5,773,510 | A | * | 6/1998 | Kazmaier .................... 525/26 |
| 6,017,615 | A | * | 1/2000 | Thakker ..................... 428/213 |

FOREIGN PATENT DOCUMENTS

| EP | 0 541 477 | 5/1993 |
| WO | WO 94/25270 | 11/1994 |

OTHER PUBLICATIONS

PCT International Search Report for International application No. PCT/US00/09880 dated Jul. 21, 2000.

* cited by examiner

*Primary Examiner*—Edward J. Cain

(57) ABSTRACT

This invention is directed to the discovery that ethylene-acid copolymers that have low melt flow index MFI (namely less than 100 g/10 min measured according to ASTM D1238 at 190° C., 2.16 kg) even with low acid content (such as less than 20 wt. %) can provide stable aqueous dispersions directly in aqueous media (i.e. free from any other solvent) with less than 1 wt. % non-dispersibles in single bases even at mild dispersion process conditions, at temperature less than 100°C., atmospheric pressure, and with low agitation speed.

12 Claims, No Drawings

COATING COMPOSITION CONTAINING A LOW MFI ETHYLENE ACRYLIC ACID COPOLYMER

FIELD OF THE INVENTION

This invention relates to improved low temperature heat sealable coating compositions containing a ethylene-acrylic acid (EAA) copolymer having a low acid content and a low melt flow index (MFI). These coating compositions are particularly suitable for coating base polymer films such as flexible packaging substrates.

BACKGROUND INVENTION

Aqueous dispersions of ethylene-acid copolymers and ionomers are in many applications preferred over the use of the ethylene-copolymer per se as they provide several advantages. The advantages include: low process requirements, as dispersions do not require the use of heavy and expensive processing equipment, such as for example extruders; application of a thin coating film as coatings of only a few micrometers can be applied instead of a minimum thickness limitation of several tens of micrometers present in the melt polymer application; as well as an environmentally friendly system, as these dispersions are water-based systems.

Furthermore these dispersions usually are dried after application accompanied by the evaporation of water and therefore they possess the properties typical of ethylene-acid copolymers or ionomers. Dispersions have excellent filming and sealing properties that can be used for applications such as coatings or adhesives on foil, metal, paper, polymer or textiles. They also show cross-linking capability and excellent adhesion for modifiers or additives in paints or inks; binders for non-wovens; rustproof aqueous coating or anti-static coating material. The dispersions can be applied by many different processes including immersion, spraying and processes using a coater device (such as an air knife, blade, gravure roll or metering rod coater), depending on the substrate and the effect desired on the application.

Ethylene-acid copolymers, such as resins available from DuPont under the Trademark NUCREL®, can be dispersed in water under appropriate conditions. These dispersions can be produced in water via an organic medium. For example, U.S. Pat. No. 4,351,931 describes low-acid low-MFI copolymers obtainable as dispersions by emulsifying a polymer solution in a non-miscible solvent in water, and removing the organic solvent. Another method for producing aqueous dispersions of ethylene-acid copolymers is by mixing the resin pellets and water with a base under agitation and at temperatures above the melting point of the resin. This second method is more preferable in producing ethylene-acid copolymer aqueous dispersions, as it is environmentally friendly (no organic solvent present during dispersion production) and it is a one-step production process. The invention discussed herein and the following discussion refers to the second method of dispersion production described above.

During dispersion formation the base cation reacts with the copolymer acid groups thus neutralizing the acid copolymer and converting the copolymer into an ionomer. This reaction induces high polarity in the copolymer that provides high stability of the dispersion and therefore no surfactants or other additives are required. Ethylene-copolymer ionomers, such as resins available from DuPont under the Trademark SURLYN®, can be dispersed in water, with no need for a base or any other additive, under agitation and at temperatures above the melting point of the resin.

The ethylene-copolymers that are the easiest to disperse are those that have high MFI and high acid content. The high MFI (or correspondingly low molecular weight) provides for easier solubility of the copolymer while the high acid content provides for higher hydrophilicity of the copolymer, both of which result in better dispersibility. Typical commercial dispersible resins have MFI higher than 300 and an acid content of 20 wt. %. As the MFI and/or the acid content decrease, the resin becomes more difficult to disperse as exhibited by an increase in the amount of non-dispersible material.

However, low MFI and/or low acid content are desirable in many dispersion applications. This is due to the fact that low MFI provides for properties such as improved scratch and abrasion resistance, and hot tack (seal strength), while low acid content provides for better adhesion to polymer substrates such as LDPE (low density polyethylene). Both properties provide better chemical resistance to the coating.

The dispersibility of an ethylene copolymer can be affected by the control of the following key factors, namely: (1) the type of base used, (2) the amount of base used, (3) the type of acid in the copolymer and (4) the process conditions during dispersion production, as follows:

(1) Type of base: Typical bases used for dispersions can be divided into two major categories. The first includes metal-based bases, such as those based on alkali and alkaline earth cations. Examples of these are sodium hydroxide (NaOH), potassium hydroxide (KOH), or zinc oxide (ZnO). The second category includes volatile bases including ammonium hydroxide ($NH_4OH$) or amines. The type of base selected is very critical for the dispersion application. Bases belonging in the first category provide the dispersion with high performance properties typical of ionomer copolymers. These include higher cross-linking, higher chemical resistance and improved mechanical properties. Bases belonging in the second category are vaporized after dispersion application and therefore are more preferred in applications where the presence of metals is not desirable and for providing higher water resistance of the dispersion coating.

(2) Amount of base: The amount of base added during dispersion production determines the level of neutralization of the copolymer, as it relates to the number of acid groups that have been neutralized by the base cation. Therefore the degree of neutralization determines the polarity of the copolymer, and the higher the neutralization level the better the dispersibility. It is observed that with increasing neutralization the particle size of the dispersion decreases but the viscosity of the dispersion increases significantly. Lower neutralization can provide for higher solids content dispersions as well as retaining an amount of carboxylic acid groups intact which can be desirable for many applications.

(3) Type of acid: The most common acids used for ethylene-copolymer dispersible resins are acrylic acid and methacrylic acid. Although both are carboxylic acids and differ only by one methyl group they exhibit very different behavior on the dispersibility of the resin. This is mostly pronounced in dispersions based on ammonium-type bases compared to alkali-based dispersions. In this case it is observed that for a typical acid content of 20 wt. % and MFI of 300, ethylene-acrylic acid copolymers can be dispersed while ethylene-methacrylic acid copolymers cannot. This provides significant limitations in the use of ethylene-methacrylic acid copolymers in a broad range of dispersion applications. On the other hand both copolymers are dispersable in alkali bases, such as NaOH.

(4) Dispersion process conditions: The basic process conditions for producing a dispersion include: temperature, pressure and agitation speed. In general, a dispersion is produced at temperatures above the resin melting point. The higher the process temperature the easier the resin disperses. Typical process temperatures are 100° C.–150° C. However, if the dispersion process temperature is set above about 100° C. (the normal boiling pressure of water) then pressure needs to be applied. Agitation enables the breakage of the resin pellets into the formation of dispersion particles. Thus, higher process temperatures and higher agitation speeds are needed for easier dispersion formation.

U.S. Pat. No. 5,387,635 proposes a method to produce dispersions of low MFI and/or low acid content ethylene-acid copolymers with low non-dispersible material according to which successful dispersions based on these resins can be produced only using appropriate proportions of mixtures of bases comprising ammonium hydroxide and alkali metal hydroxides. The Examples of U.S. Pat. No. 5,387,635 show that ethylene-acrylic acid copolymers of low MFI and/or low acid content cannot be dispersed in single bases, such as NaOH, KOH or $NH_4H$, as this results in a large amount of nondispersible material, and the patent instead teaches the use of mixed bases at given concentrations.

However, use of mixed bases in a dispersion can be undesirable in many of the dispersion applications that require for example the presence of non-metal in the dispersion, or that require high water resistance of the dispersion coating.

PCT/US94/04654 describes a base copolymer film coated with a composition comprising a copolymer of ethylene and acrylic or methacrylic acid, wherein 2 to 80% by weight of the carboxylate groups are neutralized with metal ions from groups Ia, IIa and IIb of the Periodic Table. The coating according to this document is suitable as a heat sealable coating for fast runing packaging machines. A crucial factor is the combination of hot tack and a minimum seal temperature. The neutralization with metal ions serves to improve hot tack. However, the drawback of the neutralization with metal ions is that it has a negative influence on the minimum seal temperature which is an important property in packaging films.

U.S. Pat. No. 4,173,669 describes an aqueous dispersion for coating comprising a partially neutralized copolymer comprising 99 to 75 mol % ethylene and 1 to 25 mol % of $\alpha,\beta$-ethylenically unsaturated carboxylic acid, of which at least 10% is neutralized with metallic and/or ammonium ions, the copolymer having a specific distribution of acidic units. These copolymers are dispersed at relatively high temperature, 120° C. or higher. In the examples only ethylene methacrylic acid copolymers are produced which are neutralized with either sodium or a combination of sodium and ammonium ions. With the described process it is not possible to produce ethylene acrylic acid copolymers dispersible in aqueous ammonium hydroxide at low temperatures.

Dispersions based on low MFI resins are preferred in many of the dispersion applications as they have improved properties compared to higher MFI resin dispersions, but to date it has not been possible to disperse low MFI resins in a problem-free manner, unless high dispersion process conditions (high temperature or pressure) are applied. A further preferred property in the dispersions is that they are neutralized with ammonium ions only, to provide low minimum heat seal temperatures.

SUMMARY OF THE INVENTION

This invention is based on the insight that certain ethylene-acid copolymers that have low melt flow index MWI (namely less than 100 g/10 min measured according to ASTM D1238 at 190° C., 2.16 kg) even with low acid content (such as less than 20 wt. %) can provide stable aqueous dispersions directly in aqueous media (i.e. free from any other solvent) with less than 1 wt. % non-dispersibles in single bases even at mild dispersion process conditions, at temperature less than 100° C., atmospheric pressure, and with low agitation speed.

"Aqueous medium" as used in the context of this invention refers to aqueous medium free from any other solvent, in particular organic solvents.

This invention is thus particularly concerned with ethylene-copolymer resins that have low MFI and/or low acid content and show excellent dispersibility in ammonium hydroxide. The dispersions are produced under atmospheric pressure conditions at temperatures lower than 100° C. and at agitation speed lower than 1,000 rpm.

Under these conditions it has heretofore been generally considered very difficult if not impossible that these resins can be dispersed directly from aqueous media with low (less than 1 wt. %) non-dispersible material, as has now been demonstrated.

According to a main aspect the present invention provides a coating composition comprising a branched ethylene acrylic acid interpolymer containing 10 to 30 wt. % acrylic acid and 70 to 90 wt. % ethylene, having a melt flow index of 10 to 100, preferably 20 to 80 (g/10 min at 190° C., 2.16 Kg), a melting point in the range 75° to 90° C. a percent adjacency of the acid groups in the range 2–15%, a polydispersity in the range 2–7 and a branching parameter of at least 0.6 but less than 1, wherein the carboxylate groups of the acrylic acid are neutralized by means of ammonia.

These coating compositions provide significantly lower minimum seal temperatures but similar hot tack properties as those described in the prior art. A further advantage of the present invention is that the coating compositions have improved water resistance compared with those neutralized with metal ions.

DETAILS OF THE INVENTION

As stated above the copolymer according to the invention comprises 70 to 90% ethylene and 10 to 30% acrylic acid. A lower amount of acrylic acid would make it impossible to disperse the copolymer. A higher amount of acrylic acid would make the polymer unsuitable for food grade applications. Preferably, the copolymer comprises 80 to 85% ethylene and 15 to 20% acrylic acid.

In the coating composition of the invention the carboxylate groups of the acrylic acid are neutralized with ammonia, preferably the amount of ammonia is 50 to 300% of the carboxylate groups, preferably 150 to 250% of the carboxylate groups (molar basis). When the copolymer is dried, ammonia is given off and the ionized and water sensitive carboxylate groups are converted to largely unionized and less water sensitive groups.

The copolymer preferably has a branching parameter which is in the range 0.6 to 0.85, a weight-average molecular weight $M_w$ up to 130,000 and a number average molecular weight $M_n$ up to 25,000. The copolymer usually has a crystallinity in the range 25 to 70 J/g.

In the present invention, ethylene-acrylic acid copolymers of specified characteristics and that have much more stringent requirements than the resins presented in U.S. Pat. No. 5,387,635 are very well dispersed in $NH_4OH$ under similar process conditions used in U.S. Pat. No. 5,387,635 although this could not be expected from the teachings of the aforesaid patent.

The ethylene-copolymers employed in the present invention are based on acrylic acid and, in particular include resins that have lower MFI and/or lower acid content than the examples of U.S. Pat. No. 5,387,635. In addition the dispersions of the invention as shown in the following Examples are produced at significantly lower neutralisation rates than the Examples of the above mentioned patent, i.e. under conditions which make the dispersibility even more difficult to achieve.

A factor that determines the properties and performance of a resin is the structure of the resin itself. This can be a very crucial factor when determining the dispersibility of a resin and is one of the key points of this invention. It was mentioned above that the main characteristics for an ethylene-acid copolymer to be dispersible are its MFI, acid content and acid type. However two resins that are similar in these properties may not have the same dispersibility due to their different structure. The resin structure refers to the molecular characteristics of the copolymer that include:

The distribution of the comonomers. This property can determine the sequence of the comonomers along the copolymer chain and has a strong impact on the physical properties of the resin;

The type of the copolymer chain (linear vs branched copolymer), which can determine crystallinity or solubility of the copolymer;

The polydispersity that determines the molecular weight distribution of the copolymer; this can be an important factor in dispersions as the effect of molecular weight is very critical for resin dispersibility as discussed above; and The crystallinity of the copolymer that is determined by the PE segments of the copolymer chain. Crystallinity also determines the resin melting point and therefore plays an important role in determining the process conditions for dispersion production.

All these characteristics that define the structure of the copolymer can be attained by applying appropriate conditions during resin manufacturing that will control the synthesis of the resin.

Based on the above discussion, the structural characteristics of the copolymer resins of this invention have been specified as set out above. These are results obtained from characterization analyses of these resins and are shown in terms of the range of these properties used that showed excellent dispersibility for these resins.

The parameters of the copolymers referred to above and in the following Examples were measured as follows.

Fourier Transform Infrared Spectrophotometry (FTIR Analysis) was used to determine the sequence distribution in the resins which is the distribution of comonomers along the chain in a copolymer. For this test the resin pellets were pressed into a thin film at a temperature of 290° C. The results are given in terms of percent adjacency of the acid groups, that determines whether the sequence distribution is that of a random or a blocky copolymer.

Gel permeation chromatography (GPC Analysis) was applied to measure the molecular weight and molecular weight distribution (MWD). For these experiments the samples were esterified and dissolved in 1,2,4 trichlorobenzene at 140° C. The results are given in terms of number-average molecular weight (Mn) and weight-average molecular weight (Mw). Mn and Mw give a measure of the MWD of the resins. The polydispersity of the samples is then determined by the ratio of Mw vs Mn. These results also include information on the branching of the resins.

From the branching parameter values it is indicated that the resins are nonlinear chains. The degree of branching is between 0.6 and 0.8 for most resins.

Thermal Analysis, by Differential scanning calorimetry, was used to determine the melting point of the resins examined. We see from these results that the dispersible resins have melting points in the range of 75 to 90° C. and crystallization temperatures from 45 to 58° C. These temperatures are related to the acid content of the resin. It is in general considered that the lower the melting point the easier the dispersibility of the resin is. Therefore it is important to notice that a resin with a melting point as high as 89° C. was able to be dispersed under the temperature conditions of approximately 95° C. during dispersion production.

Thermal fractionation analysis was applied to determine the crystallinity of the samples by detecting the fractions of PE segments present in the resins. It was observed that even a difference of 2 wt % in the acid content can have an effect on crystallinity. Also, that methacrylic acid-based resins have higher crystallinity and longer PE segment lengths compared to acrylic acid based copolymers under similar conditions.

A further aspect of the invention comprises a process of producing a coating composition according to the invention which comprises contacting a branched ethylene acrylic acid interpolymer containing 10 to 30 wt. % acrylic acid and 70 to 90 wt. % ethylene, having a melt flow index of at most 100 (g/10 min at 190° C., 2.16 Kg), a melting point in the range 75° to 90° C., a percent adjacency of the acid groups in the range 2–15%, a polydispersity in the range 2–7 and a branching parameter of at least 0.6 but less than 1, with an aqueous medium containing ammonia, at a temperature above the melting point of the copolymer but not exceeding 100° C. and at atmospheric pressure.

The coating composition can be a solution, dispersion or emulsion of the copolymer in water, but is preferably a dispersion in water.

According to a further aspect the coating composition according to the present invetntion is used to coat a base polymer film. Examples of these films are flexible packaging films such as polyolefin films, in particular polypropylcue, especially biaxially oriented polypropylene. Other suitable polymer films arc those composed of polyolefins other than polypropylene, e.g. polyethylene, and polyester and polyaniide films. Also it can be used for other types of flexible packaging substrates including but not limited to paper, paper board, metal foil, known by the skilled person.

The coating compositions according to the present invention can be further formulated by persons skilled in the art to make them even more suitable for using on films. For instance, depending on the final use of the coating composition, conventional additives can be added A preferred additive is a wax, such as a microcrystalline wax or a polyethylene wax, which serves as an anti-blocking agent as well as to improve the coefficient of friction of the final film. Other types of additives are fumed silica, which reduces the tack of the coating at room terperature, calcium carbonate, talc, cross-linking agents and anti-static agents.

The base polymer film for which the coating composition of the present invention is used will generally have a thickness of 10 to 100 μm, as is conventionally used according to the state of the art.

The coating composition can be applied to the spice of the base polymer film in any suitable manner known in the art such as gravure coating, roll coating, dipping, spraying, etc. Typically, the coating composition can be applied to this substage with a thickness of 0.5 to 3 μm. In general, the thickness of the applied coating is such that it is sufficient to impart the desired scalability, coefficient of friction and hot slip characteristics to the substrate polymer film.

The invention will be fitter described in the following Examples and contrasted with comparative Examples. Preparation of the ethylene-acid copolymers containing 10 to 30 wt. % acid, having a melt flow index of 10 to 100 (g/10 min at 190° C., 2.16 Kg), a melting point in the range 75° to 90° C., a percent adjacency of the acid groups in the range 2–15%, a polydispersity in the range 2–7 and a branching parameter of at least 0.6 but less than 1 is accomplished by one skilled in the art applying the basic principles taught in U.S. Pat. No. 4,351,931. This patent describes low-acid low-MFI copolymers obtainable as dispersions by emulsifying a polymer solution in a non-miscible solvent in water, and removing the organic solvent.

EXAMPLE 1

90 g of pellets of an ethylene-acrylic acid copolymer having 20 wt. % acid content and a MFI of 60 (g/10 min at 190° C., 2.16 kg), 360 g of demineralized water and 11.5 g of ammonium hydroxide (29.5 wt. % aqueous $NH_3$) were charged simultaneously in a glass reactor equipped with a condenser and a U-type stirrer. The reactor was immersed into a heating bath containing silicon oil and the temperature of the bath was set to 115° C. The agitation speed of the stirrer was set to 600 rpm through a controlled speed helical-type agitator. Agitation was carried out at ambient pressure. The temperature at the upper surface of the reactor mixture was measured to be 90° C. After about 4 hours a uniform dispersion was formed. At this point the heating bath was removed away from the reactor and the reactor was allowed to cool down at room temperature. The dispersion was filtered through a 0.5 mm sieve leaving no residuals on the filter which indicates that all pellets were dispersed. The resulting dispersion is a white liquid having 20 wt % solids and where 80% of the copolymer acid groups have been neutralized by ammonium. The dispersion is stable even after 6 months from its preparation.

Molecular analysis of the copolymer showed a percentage adjacency of 3.4%, a polydispersability of 4.98 for a value $M_n$ of 19455 g/mole and $M_w$ 96930 g/mole, and a branching parameter (g') of 0.72. Its melting point was 82° C. and its crystallinity 35.3 J/g.

EXAMPLE 2

112.5 g of pellets of an ethylene-acrylic acid copolymer having 18 wt. % acid content and a MFI of 60 (g/10 min at 90° C., 2.16 kg), 337.5 g of demineralized water and 32.9 g of ammonium hydroxide (29.5 wt % concentrated aqueous ammonia) were charged simultaneously in a glass reactor. The dispersion process was as described in Example 1. The resulting dispersion was very viscous. Into the dispersion there were added 112.5 g water and the mixture was stirred at room temperature for one hour. The dispersion was filtered through a 0.5 mm sieve leaving <2 wt. % residuals on the filter which indicates a high yield of dispersion The resulting dispersion is a translucent slightly white liquid having 20 wt % solids and where 200% of the copolymer acid groups have been neutralized by ammonium. The dispersion is stable even after 1 month from its preparation Molecular analysis of the copolymer showed a percentage adjacency of 3.2%, a polydispersability of 5.2 for a value $M_n$ of 22679 g/mole and $M_w$ 117498 g/mole, and a branching parameter (g) of 0.70. Its melting point was 82° C. and its crystallinity 43.7 J/g.

This dispersion is designated as Aquaseal® 1211.

COMPARATIVE EXAMPLE 3

It was attempted to produce an aqueous dispersion based on the resin and formulation of Example 2 by a process operating under high temperature (>100° C.) and high pressure (>1 atm) but this failed in producing a uniform dispersion. This process resulted in a dispersion having a high volume of large particles of particle size of 20 μm and "spongy" material which absorbed significant amount of water.

It was entirely unexpected that this copolymer which could not be effectively dispersed using the usual high temperature and pressure as illustrated by this Comparative Example, was effectively dispersed under the milder conditions of Example 2, namely below 100° C. at atmospberic pressure.

COMPARATIVE EXAMPLE 4

As reported in Tables 3 and 4 and Examples 5 and 6 of U.S. Pat. No. 5,387,635, an ethyientacryeac acid copolymer with 15 wt. % acrylic acid and a MFI of 24 (g/10 min at 125° C., 2.16 kg) could not be dispersed in $NH_4OH$ (non-dispersible solids content of about 32 wt %) using a dispersion procedure at 95° C. It is believed that this failure was due to the properties of the copolymer used, such as for example its branching or polydispersity or any other properties discussed above.

EXAMPLE 5

112.6 g of pellets of an ethylene-methacrylic acid copolymer having 28 wt. % acid content and a MFI of 15 (g/10 min at 190° C., 2.16 kg), 338.2 g of demineralized water and 17.1 g of ammonium hydroxide (29.5 wt. % concentrated aqueous $NH_3$) were charged simultaneously in a glass reactor. The dispersion process was as described in Example 1. The dispersion was filtered through a 0.5 mm sieve leaving no residuals on the filter which indicates that all pellets were dispersed. The resulting dispersion is a translucent liquid having 25 wt. % solids, and where 80% of the copolymer acid groups have been neutralized by ammonium. The dispersion is stable even after 14 months from its preparation.

Molecular analysis of the copolymer showed a percentage adjacency of 13.0% and a polydispersability of 2.96 for a value $M_n$ of 19817 g/mole and $M_w$ 58665 g/mole, and a branching parameter (g') of 0.80. Its melting point was 81° C. and its crystallinity 27.05 J/g.

COMPARATIVE EXAMPLE 6

112.5 g of pellets of an ethylene-methacrylic acid copolymer having 20 wt. % acid content and a MFI of 300 (g/10 min at 190° C., 2.16 kg) 337.5 g of demineralized water and 30.6 g of ammonium hydroxide (29.1 wt. % concentrated aqueous $NH_3$) were charged simultaneously in a glass reactor. The dispersion process was as described in Example 1. The dispersion was filtered through a 0.5 mm sieve leaving 14 g of residuals on the filter which corresponds to 12.4% undispersed material. The resulting dispersion is a white liquid having a nominal solids content of 25 wt. %, and a nominal degree of neutralization of 200%.

Molecular analysis of the high MFI copolymer showed a percentage adjacency of 4.5% and a polydispersability of 4.1 for a value $M_n$ of 13558 g/mole and $M_w$ 56133 g/mole, and a branching parameter (g') of 0.67. Its melting point was 84° C. and its crystallinity 53.64 J/g.

From this Comparative Example 6 it is noted that a high MFI ethylene-methacrylic acid copolymer of 20 wt % acid content does not disperse in $NH_4OH$ under the process conditions cited even at high degree of neutralization, whereas the ethylene-methacrylic acid copolymer with higher acid content of Example 5 is easily dispersed in $NH_4OH$ base under the same process conditions even with a significantly lower MFI.

It is noteworthy that the Examples according to the invention, with a copolymer of much lower MFI, quite unexpectedly achieve a dispersibility which is comparable to the high MFI copolymer as in Comparative Example 6, or a copolymer based on acrylic acid.

COMPARATIVE EXAMPLE 7

As reported in Tables 1 and 2 and Examples 2 and 3 of U.S. Pat. No. 5,387,635, an ethylene/acrylic acid copolymer with 27 wt. % acrylic acid and a MFI of 15 (g/10 min at 125° C., 2.16 kg) could not be dispersed in $NH_4OH$ or KOH (non-dispersible solids content of about 85 wt % and 64 wt % respectively) using a dispersion procedure at 95° C. It is believed that this failure was due to the properties of the copolymer used, such as for example its branching or polydispersibility or any of the other properties discussed above.

EXAMPLE 8

Coating compositions were prepared by adding to a fine dispersion of 20 wt. % solids prepared according to Example 2 (Aquaseal® 1211), various amounts of sodium hydroxide (NaOH), high density polyethylene (HDPE) wax sold by Paramelt as Aquaseal® 1205 and an anti-blocking agent, such as silica, calcium carbonate or polymeric anti-blocking agent. Diakon® API1 having an average particle size of 3 microns available from Zeneca Resins was used for sample 11 to 14.

Further, coating compositions were prepared by adding various amounts of sodium hydroxide (NaOH), microcrystalline wax having an average size of about 0.12 to 0.2 $\mu m$ sold by Michelman as 41540 and Paraloid®, fumed silica having an average particle size of 3 to 5 microns sold as Syloid 72, to the dispersion of Example 1 and an aqueous solution or fine dispersion of 25% wt. of an ammonia salt of a copolymer of 80% wt. of ethylene 20% wt. of acrylic acid, sold by Michelman as Primacor® 4983.

Further details are given in Table 1.

TABLE 1

Table of the experiments

| Sample number | Resin | Wax | Wax amount | Anti blocking agent amount | Neutralization (%) |
|---|---|---|---|---|---|
| 1* | Primacor® 4983 | ML41540 | 4 phr** | 0.3% | 0 |
| 2* | Primacor® 4983 | ML41540 | 4 phr | 0.3% | 2 |
| 3* | Primacor® 4983 | ML41540 | 4 phr | 0.3% | 25 |
| 4* | Primacor® 4983 | ML41540 | 4 phr | 0.3% | 80 |
| 7 | Aquaseal® 1211 | ML41540 | 4 phr | 0.3% | 0 |
| 8 | Aquaseal® 1211 | ML41540 | 4 phr | 0.3% | 2 |
| 9 | Aquaseal® 1211 | ML41540 | 4 phr | 0.3% | 25 |
| 10 | Aquaseal® 1211 | ML41540 | 4 phr | 0.3% | 80 |
| 11 | Aquaseal® 1211 | Aquaseal® 1205 | 9.97% | 0.3% | 0 |
| 12 | Aquaseal® 1211 | Aquaseal® 1205 | 9.97% | 0.3% | 2 |
| 13 | Aquaseal® 1211 | Aquaseal® 1205 | 9.97% | 0.3% | 25 |
| 14 | Aquaseal® 1211 | Aquaseal® 1205 | 9.97% | 0.3% | 80 |

*Comparative data
**Parts per weight per 100 parts of resin

The neutralization was carried out to make a comparison with the teaching of U.S. Pat. No. 5,419,960. More in particular, this document teaches to neutralize ammonium salts of ethylene/acrylic acid copolymers.

Water was then added to bring the final composition to a solids content of ~13% (between 12 and 14%). Each of the compositions was applied to one surface of co-extruded, three layer, biaxially oriented polypropylene film samples having a total thickness of about 30 $\mu m$. The polymer of the core layer of this film was a polypropylene homopolymer; the polymer of the outer layers was a random copolymer of polypropylene and ethylene.

The coatings were applied utilizing standard gravure coating apparatus and techniques i.e. a Dixon coater model 164 Mk2. Before coating, the film had been treated by subjecting both surfaces to discharge treatment and priming the treated surfaces. The total coating weight following drying of the film was about 0.7 to 1.0 gram per square meter of film.

EXAMPLE 9

The films of Example 8 were tested on heat seal, hot tack, seal after 24 hours and immersion in water. The heat seal strengths were measured with a Q puller on seals made with a Q sealer at 5 psi and 2 sec. dwell time at temperatures varied from 50° C. to 120° C.

MST—The temperature in ° C. to reach 200 g/25 mm seal strength.

Heat seals treshold 300 g/25 mm: The temperature in ° C. to reach 300 g/25 mm seal strength.

Heat seals treshold 400 g/25 mm: The temperature in ° C. to reach 400 g/25 mm seal strength.

DELTA—The temperature increase to raise the seal strength from 200 to 40.0 g/25 mm.

SS—The average of seal strength measured at 100, 110 and 120° C.

Hot tack

Hot tack was tested at the following conditions:

0.5 second and 15 PSI on the Theller, hot tack tester (peak)

0.5 second, 5 PSI and 120 g spring, both jaws heated.

The following data was noted for the Theller hot tack:

MHHT—The temperature in ° C. to reach 200 g/25 mm in hot tack strength,

HTS—The average of hot tack strength measured at 110, 120 and 130° C.

The following data was noted for spring hot tack:

RANGE—The temperature range where the hot tack results are below 10% of opening.

All samples tested had comparable and acceptable slip, dry blocking, wet blocking, haze and clarity properties. The results of the hot tack and heat seal measurements are given in Table 2. These results show that the coating compositions according to the present invention have good hot tack properties while maintaining a very low minimum heat seal temperature, whereas the composition according to the state of the art (examples 1 to 4) show an increase in minimum heat seal temperature when they are neutralized with sodium hydroxide.

TABLE 2

| Experiment | 1 | 2 | 3 | 4 | 7 | 8 | 9 | 10 | 11 | 12 | 13 | 14 |
|---|---|---|---|---|---|---|---|---|---|---|---|---|
| Hot tack - RANGE | — | — | 85->130 | 70–110 | 63–96 | 84–94 | 79->130 | 79->130 | 75–94 | 76–92 | 73->130 | 72–129 |
| Theller hot tack - MHHT | 77 | 71 | 75 | 81 | 53 | 64 | 71 | 69 | 72 | 73 | 70 | 84 |
| Theller hot tack - HTS | 372 | 264 | 210 | 191 | 372 | 365 | 178 | 196 | 436 | 417 | 211 | 179 |
| Heat seals - MST | 69 | 69 | 78 | 74 | 54 | 66 | 72 | 71 | 63 | 64 | 67 | 77 |
| Heat seals threshold 300 g/25 mm | 72 | 72 | 80 | 78 | 57 | 68 | 76 | 79 | 66 | 66 | 69 | 81 |
| Heat seals threshold 400 g/25 mm | 74 | 83 | 82 | 82 | 59 | 70 | 78 | 84 | 68 | 68 | 83 | 83 |
| Heat seals - DELTA | 5 | 14 | 4 | 8 | 5 | 4 | 6 | 13 | 5 | 4 | 6 | 6 |
| Heat seals - SS | 473 | 444 | 503 | 466 | 469 | 434 | 522 | 469 | 456 | 532 | 505 | 490 |

What is claimed is:

1. A coating composition comprising a branched ethylene acrylic acid interpolymer containing 10 to 30 wt. % acrylic acid and 70 to 90 wt. % ethylene, having a melt flow index of 10 to 100 (g/10 min at 190° C., 2.16 Kg), a melting point in the range 75° to 90° C., a percent adjacency of the acid groups in the range 2–15%, a polydispersity in the range 2–7 and a branching parameter of at least 0.6 but less than 1, wherein the acid groups of the acrylic acid are neutralized by means of ammonia.

2. The coating composition according to claim 1, wherein the ammonia is present in a sufficient amount to neutralize 50 to 300 % of the acid groups, preferably 150 to 250% of the acid groups of acrylic acid.

3. The coating of claim 2 composition, having a melt flow index of 20 to 80 g/10 min.

4. The coating composition of claim 3, wherein the acrylic acid content of the copolymer is at most 20 wt. % acid.

5. The coating composition of claim 4 wherein the branching parameter is in the range 0.6 to 0.85.

6. The coating composition of claim 5, wherein the copolymer has a weight-average molecular weight $M_w$ up to 130,000, and a number-average molecular weight $M_n$ up to 25,000.

7. The coating composition of claim 6, wherein the copolymer has a crystallinity in the range 25 to 70 J/g.

8. The coating composition of claim 1, which is a solution, dispersion or emulsion of the copolymer in water.

9. A process of using a coating composition of claim 1 to coat a base polymer film.

10. The process according to claim 9, wherein the base polymer film is a polypropylene film.

11. A base polymer film coated with a coating composition of claim 1.

12. A process of producing a coating composition according to claim 1 which comprises contacting a branched ethylene acrylic acid interpolymer containing 10 to 30 wt. % acrylic acid and 70 to 90 wt. % ethylene, having a melt flow index of at most 100 (g/10 min at 190° C., 2.16 Kg), a melting point in the range 75° to 90° C., a percent adjacency of the acid groups in the range 2–15%, a polydispersity in the range 2–7 and a branching parameter of at least 0.6 but less than 1, with an aqueous medium containing ammonia, at a temperature above the melting point of the copolymer but not exceeding 100° C. and at atmospheric pressure.

* * * * *